(12) United States Patent
Buckhout

(10) Patent No.: US 10,112,502 B2
(45) Date of Patent: Oct. 30, 2018

(54) VEHICLE BATTERY HEATING SYSTEM

(71) Applicant: Faraday&Future Inc., Gardena, CA (US)

(72) Inventor: Kameron Fraige Saad Buckhout, Inglewood, CA (US)

(73) Assignee: FARADAY&FUTURE INC., Gardena, CA (US)

(*) Notice: Subject to any disclaimer, the term of this patent is extended or adjusted under 35 U.S.C. 154(b) by 229 days.

(21) Appl. No.: 15/060,308

(22) Filed: Mar. 3, 2016

(65) Prior Publication Data

US 2017/0253142 A1    Sep. 7, 2017

(51) Int. Cl.
*H01M 10/625* (2014.01)
*B60L 11/18* (2006.01)
*B60L 1/02* (2006.01)
*H01M 10/48* (2006.01)
*H01M 2/10* (2006.01)
*H01M 10/615* (2014.01)
*H01M 10/63* (2014.01)
*H01M 10/6571* (2014.01)
*H05B 3/20* (2006.01)

(52) U.S. Cl.
CPC .......... *B60L 11/1875* (2013.01); *B60L 1/02* (2013.01); *B60L 11/1868* (2013.01); *H01M 2/1077* (2013.01); *H01M 10/486* (2013.01); *H01M 10/615* (2015.04); *H01M 10/625* (2015.04); *H01M 10/63* (2015.04); *H01M 10/6571* (2015.04); *H05B 3/20* (2013.01); *H01M 2220/20* (2013.01)

(58) Field of Classification Search
CPC .......................... H01M 10/615; H01M 10/625
See application file for complete search history.

(56) References Cited

U.S. PATENT DOCUMENTS

| | | | |
|---|---|---|---|
| 2010/0089547 A1* | 4/2010 | King | B60L 3/0046 165/42 |
| 2011/0091750 A1* | 4/2011 | Claypole | H01M 10/6569 429/50 |
| 2014/0070013 A1* | 3/2014 | Stanek | B60H 1/00 237/28 |

* cited by examiner

*Primary Examiner* — Olatunji A Godo
(74) *Attorney, Agent, or Firm* — Knobbe Martens Olson & Bear LLP

(57) ABSTRACT

Disclosed herein are battery systems for electric vehicles. An electric vehicle may include a first battery. The first battery may be configured to power various low voltage systems. For example, the first battery may provide the power to start the vehicle. The vehicle may include a second battery. The second battery may be configured to power one or more electric motors for propelling the vehicle. The first battery may supply power necessary to engage and/or access the power stored in the second battery. The first battery may include a heater to ensure that the first battery can supply ample power to initiate a start sequence in low temperatures.

20 Claims, 8 Drawing Sheets

VEHICLE BATTERY HEATING SYSTEM

CROSS-REFERENCE TO RELATED APPLICATIONS

The present application is related to Ser. No. 15/060,381, entitled "FLEXIBLE CIRCUIT FOR VEHICLE BATTERY," Ser. No. 15/060,416, entitled "BUS BAR AND PCB FOR VEHICLE BATTERY," and Ser. No. 15/060,331, entitled "ELECTRIC VEHICLE BATTERY," filed on the same day as the present application. Each of the above-referenced applications is hereby expressly incorporated by reference in its entirety and for all purposes.

BACKGROUND

Field

This disclosure relates to vehicle battery systems, and more specifically to systems and methods for providing heat to battery cells for improved cold-weather operation.

Description of the Related Art

Electric vehicles, hybrid vehicles, and internal combustion engine vehicles generally contain a low voltage automotive battery to provide power for starting the vehicle and/or to provide power for various other electrically powered systems. Automotive batteries typically provide approximately 12 volts, and may range up to 16 volts. Such batteries are typically lead-acid batteries. In electric or hybrid vehicles, a low voltage automotive battery may be used in addition to higher voltage powertrain batteries.

SUMMARY

The systems and methods of this disclosure each have several innovative aspects, no single one of which is solely responsible for its desirable attributes. Without limiting the scope as expressed by the claims that follow, its more prominent features will now be discussed briefly.

An electric vehicle may include a first battery. The first battery may be configured to power various low voltage systems. For example, the first battery may provide the power to start the vehicle. The vehicle may include a second battery. The second battery may be configured to power one or more electric motors for propelling the vehicle. The first battery may supply power necessary to engage and/or access the power stored in the second battery. The first battery may include a heater to ensure that the first battery can supply ample power to initiate a start sequence in low temperatures.

In some implementations, a low voltage battery for an electric vehicle includes a battery housing enclosing a plurality of electrochemical cells disposed therein. A heat source may be disposed within the battery housing. The heat source may be configured to increase the temperature of the plurality of electrochemical cells when activated. A temperature sensor may be disposed within the housing. The sensor may be configured to measure the temperature of at least one of the plurality of electrochemical cells. Circuitry may also be disposed within the housing. The circuitry may be in communication with the temperature sensor and/or the heat source. The circuitry may be configured to receive temperature information from the temperature sensor and control the heat source based at least in part on the received temperature information.

In some aspects, the plurality of electrochemical cells have a minimum operating temperature. The circuitry may be configured to activate the heat source when the temperature sensor measures a temperature lower than the minimum operating temperature. The circuitry may be configured to deactivate the heat source when the temperature sensor measures a preselected deactivation temperature that is greater than or equal to the minimum operating temperature. The circuitry may be configured to deactivate the heat source after a preselected maximum heating time.

In some implementations, an electric vehicle may include a battery heating system disposed within the vehicle. A first battery may include a housing, a plurality of electrochemical cells within the housing, and a heat source within the housing. A second battery may also be disposed within the battery. The second battery may be located in a different position than the first battery. For example, the first battery may be positioned in the front half of the vehicle while the second battery may be positioned in the rear half of the vehicle. The first battery may have a first voltage battery that is configured to provide power to engage the second battery. The second battery may be configured to provide power to the heat source.

Some implementations include a method of starting an electric vehicle. The method may include one or more of the following steps. For example, the method may include transmitting power from a first battery of an electric vehicle to engage a second battery of the electric vehicle. The method may include transmitting power from the second battery to a heat source disposed within the first battery. The method may include warming the first battery with the heat source.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations are merely examples and are not intended to be limiting. Throughout the drawings, similar symbols typically identify similar components, unless context dictates otherwise.

DETAILED DESCRIPTION OF THE PREFERRED EMBODIMENT

The following description is directed to certain implementations for the purpose of describing the innovative aspects of this disclosure. However, a person having ordinary skill in the art will readily recognize that the teachings herein can be applied in a multitude of different ways. In some implementations, the word "battery" or "batteries" will be used to describe certain elements of the embodiments described herein. It is noted that "battery" does not necessarily refer to only a single battery cell. Rather, any element described as a "battery" or illustrated in the Figures as a single battery in a circuit may equally be made up of any larger number of individual battery cells and/or other elements without departing from the spirit or scope of the disclosed systems and methods.

Reference may be made throughout the specification to "12 volt" power systems or sources. It will be readily apparent to a person having ordinary skill in the art that the phrase "12 volt" in the context of automotive electrical systems is an approximate value referring to nominal 12 volt power systems. The actual voltage of a "12 volt" system in a vehicle may fluctuate as low as roughly 4-5 volts and as high as 16-17 volts depending on engine conditions and power usage by various vehicle systems. Such a power system may also be referred to as a "low voltage" system. Some vehicles may use two or more 12 volt batteries to provide higher voltages. Thus, it will be clear that the systems and methods described herein may be utilized with battery arrangements in at least the range of 4-34 volts without departing from the spirit or scope of the systems and methods disclosed herein.

Figure 2:
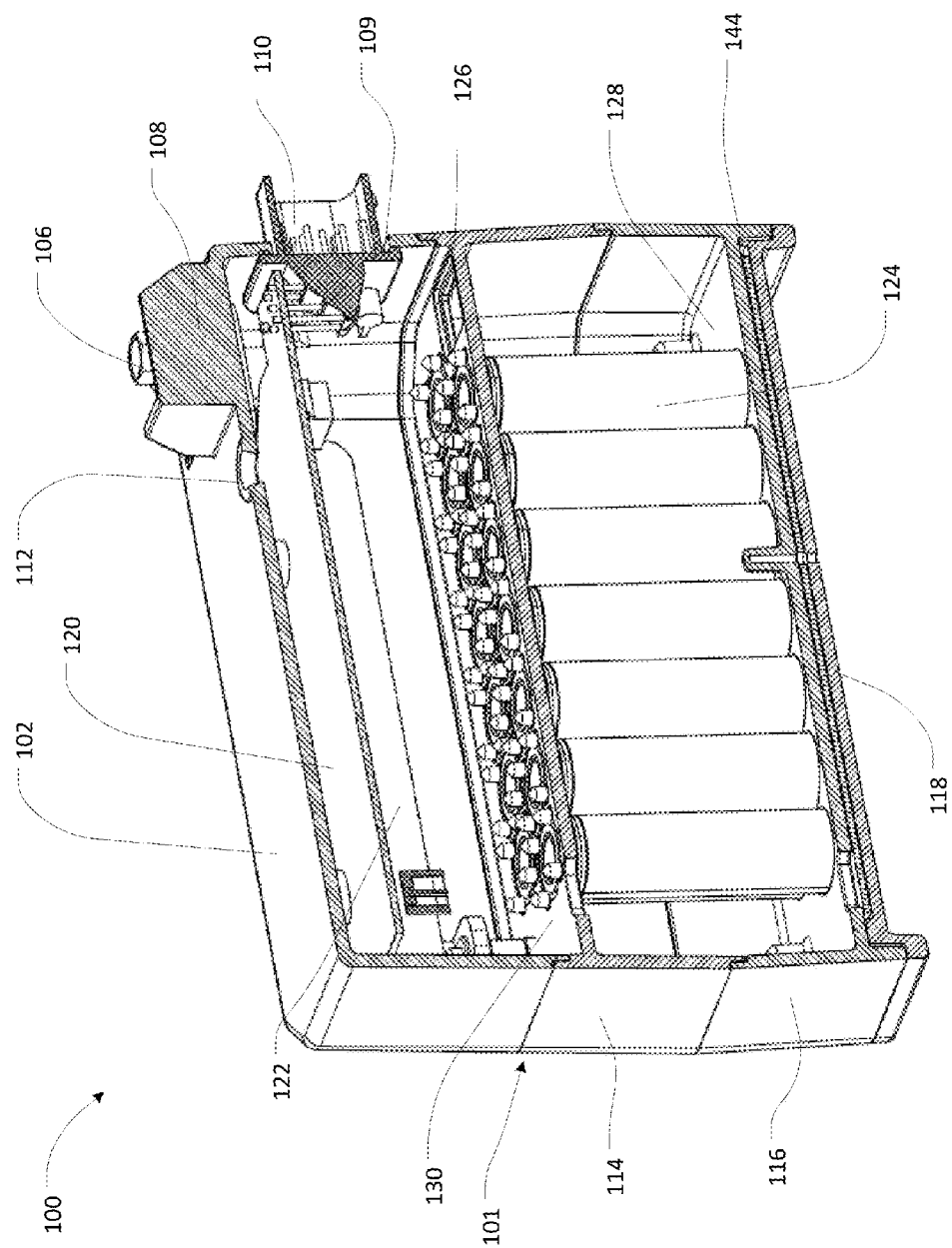
FIG. 2 is a cross sectional view of an assembled battery of FIG. 1.

To assist in the description of various components of the battery systems, the following coordinate terms are used (see, e.g., FIGS. 2-5). A "longitudinal axis" is generally parallel to the longest dimension of the battery housing embodiments depicted. A "lateral axis" is normal to the longitudinal axis. A "transverse axis" extends normal to both the longitudinal and lateral axes. For example, the cross sectional view of FIG. 2 depicts a plurality of cylindrical cells; each cell is oriented parallel to the transverse axis, while the cells are oriented in a row of seven cells along a line parallel to the longitudinal axis.

In addition, as used herein, "the longitudinal direction" refers to a direction substantially parallel to the longitudinal axis, "the lateral direction" refers to a direction substantially parallel to the lateral axis, and the "transverse direction" refers to a direction substantially parallel to the transverse axis.

The terms "upper," "lower," "top," "bottom," "underside," "top side," "above," "below," and the like, which also are used to describe the present battery systems, are used in reference to the illustrated orientation of the embodiment. For example, as shown in FIG. 2, the term "top side" may be used to describe the surface of the battery housing containing the positive and negative terminal posts, while the term "bottom" may be used to describe the location of the baseplate.

Traditional gasoline powered cars typically include a low voltage SLI (starting, lighting, ignition) battery. Similarly, electric vehicles may include a low voltage SLI battery along with a high voltage battery system having significant energy storage capacity and suitable for powering electric traction motors. The low voltage battery may be necessary to provide the startup power, power an ignition, close a high voltage battery contactor, and/or power other low voltage systems (e.g. lighting systems, electronic windows and/or doors, trunk release systems, car alarm systems, and the like).

In addition to powering the vehicle's propulsion motors, the high voltage batteries' output may be stepped down using one or more DC-to-DC converters to power some or all of the other vehicle systems, such as interior and exterior lights, power assisted braking, power steering, infotainment, automobile diagnostic systems, power windows, door handles, and various other electronic functions when the high voltage batteries are engaged.

High voltage batteries may be connected to or isolated from other vehicle circuitry by one or more magnetic contactors. Normally open contactors require a power supply in order to enter or remain in the closed circuit position. Such contactors may be configured to be in the open (disconnected) configuration when powered off to allow the high voltage batteries to remain disconnected while the vehicle is powered off. Thus, on startup, a small power input is required to close at least one contactor of the high voltage battery pack. Once a contactor is closed, the high voltage batteries may supply the power required to keep the contactor(s) closed and/or supply power to other vehicle systems.

Particular embodiments of the subject matter described by this disclosure can be implemented to realize one or more of the following potential advantages. Rather than using a traditional lead-acid automobile battery, the present allows for a smart rechargeable battery that does not require a fluid filled container. In some aspects, one or more individual cells in a housing may be monitored individually or in subsets. In some aspects, additional individual cells may be provided within the housing such that the connected cells can provide more voltage than necessary to compensate for the potential of the loss of one or more of the cells. The disclosed design may be easier and/or less expensive to manufacture. For example, the number of manufacturing steps may be minimized and the labor may be simplified and/or made more efficient. For example, two halves of a battery housing may be assembled separately and electrical components may later be coupled together in one final step when the two housing halves are combined. Such a construction may minimize the number of sealing steps while sensitive parts are contained within the housing. A desiccant may be provided to remove excess moisture in the housing in order to further protect the electric components and/or cells within the housing. A valve may help prevent unsafe pressures from building up within the housing. In some aspects, the housing may be designed such that the parts inside the housing are inhibited from moving excessively and/or vibrating excessively while a vehicle is operated.

These, as well as, other various aspects, components, steps, features, objects benefits, and advantages will now be described with reference to specific forms or embodiments selected for the purposes of illustration. It will be appreciated that the spirit and scope of the cassettes disclosed herein is not limited to the selected forms. Moreover, it is to be noted that the figures provided herein are not drawn to any particular proportion or scale, and that many variations can be made to the illustrated embodiments.

Figure 1:
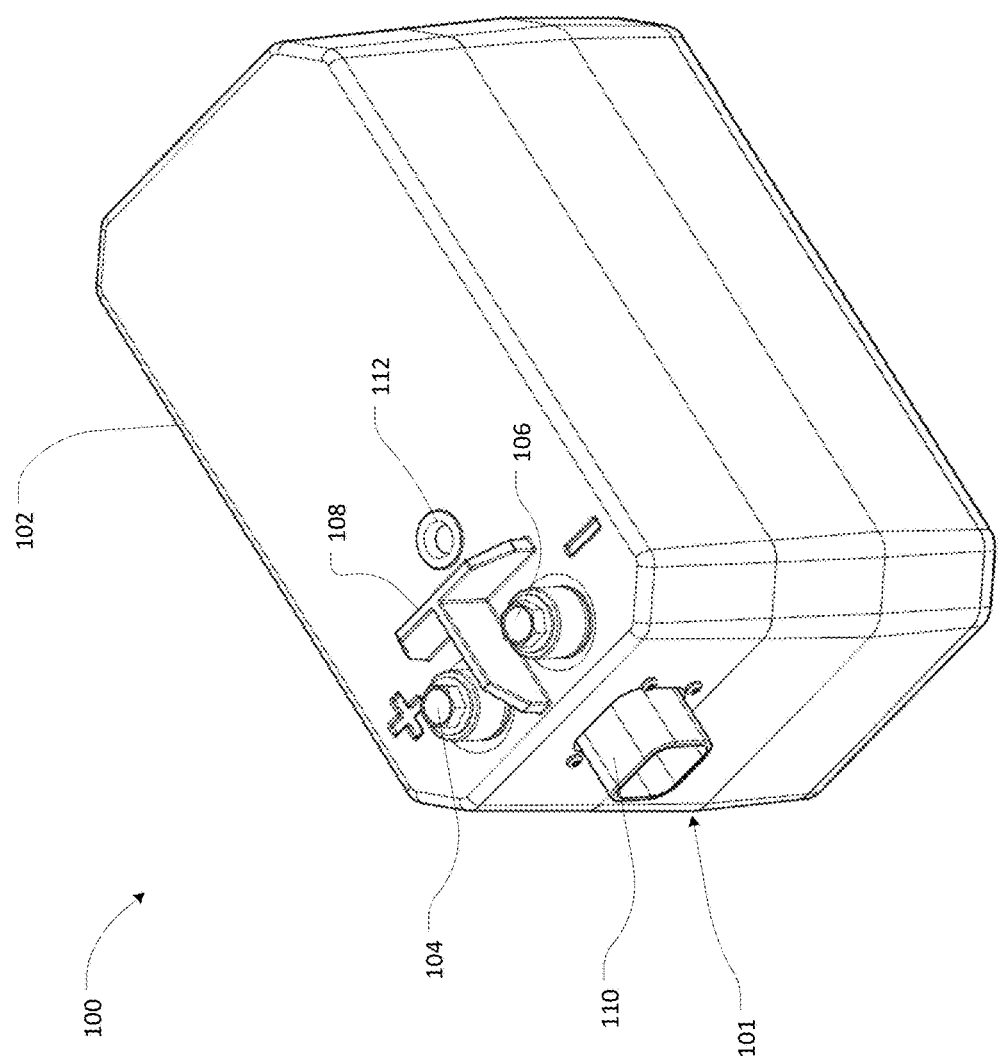
FIG. 1 is a top perspective view of an assembled low voltage automotive battery in accordance with an exemplary embodiment.

FIG. 1 is a top perspective view of an assembled battery 100 in accordance with an exemplary embodiment. The exterior of the lid 102 of the battery housing 101 includes a positive terminal post 104, a negative terminal post 106, a terminal post protection structure 108, a CAN connector 110, and a pressure vent 112. The positive terminal post 104 and negative terminal post 106 are connected to the interior components via internal bus bars and circuitry as described with reference to FIGS. 1 and 2.

The terminal post protection structure 108 may be formed as a single piece with the housing lid, for example, by molding or 3D printing. The protection structure 108 is provided in order to protect the terminal posts 104 and 106 from unintentional or harmful contact. In addition, the protection structure 108 can prevent inadvertent creation of a short circuit between the terminal posts 104 and 106. For example, if a vehicle owner or mechanic drops a metal tool across the terminal posts 104 and 106 while performing maintenance, a short circuit is created. If the owner or mechanic attempts to retrieve the tool while it is in contact with both posts 104 and 106, severe electric shock may result. Thus, the terminal post protection structure 108 should include a longitudinal portion raised in the transverse direction far enough that a straight metal tool cannot touch both terminal posts 104 and 106 at the same time.

The valve 112 may be a waterproof pressure relief valve, such as a GORE protective vent. A waterproof pressure relief valve may allow the pressure within the battery housing to equalize with the outside air pressure while preventing the low-humidity atmosphere within the battery 100 from being compromised. The valve 310 is described in greater detail with reference to FIG. 2.

FIG. 2 depicts a cross sectional view of an assembled battery 100 in accordance with an exemplary embodiment. The unitary battery housing 101 comprises a lid 102 and a lower portion including an upper housing body 114, a lower housing body 116, and a baseplate 118. The lid 102 includes the pressure vent 112, negative terminal post 106, terminal post protection structure 108, and an opening 109 for the CAN connector 110, as shown in the exterior view of FIG. 1.

Within the housing 101, the CAN connector 110 may be in electrical communication with a monitoring and control PCB 120. The terminal post 106 is in electrical contact with a bus bar 122. Other circuitry (not shown) in electrical contact with the bus bar 122 is further connected electrically to a plurality of electrochemical cells 124. A desiccant holder 126 may also be located within the housing 101.

The cross sectional view of FIG. 2 illustrates several advantages of the battery 100 over conventional designs. The unitary housing 101 provides a sealed environment for all internal components of the battery 100. In many existing automotive battery designs, the battery components are held in place by an internal structure, with an additional external protective structure, or blast shield, required to protect the battery 100 and maintain the desired interior conditions. Instead, the present battery housing 101 may contain integrated interior structural components to eliminate the need for additional interior components. For example, the lower housing body 116 described above may include an integrated lower cell holder framework 128, comprising an array of cylindrical openings sized to secure one end of each of the electrochemical cells 124. Similarly, the upper housing body 114 described above may include an integrated upper cell holder framework 130, comprising an array of cylindrical openings sized and arranged identically to the openings of the lower cell holder framework 128, so as to secure the opposite end of each of the electrochemical cells 124. Thus, the cells 124 may be held in place within the housing 101. In some embodiments, the portion of the lower space surrounding the cells 124 may be filled with an electronics potting compound to further secure the cells 124 in place and/or to reduce the effects of vibrations or other mechanical stresses on the battery 100. The potting compound may be any suitable gelatinous or solid compound, such as a silicone or other rubber gel, thermal setting plastics, epoxy, or the like.

The battery housing 101 will preferably be sealed or substantially sealed at all joints and ports so as to provide a stable environment for the electrochemical cells 124. Pressure and humidity variations may have significant detrimental effects on the battery 100. More specifically, the interior of the battery 100 should be kept at substantially the same pressure as the ambient air pressure to avoid excessive wear to the battery housing, seals, or other components. The interior of the housing 101 should also be kept relatively dry, as condensation or excess humidity may shorten battery life. Thus, a combination of environmental features may be provided to optimize moisture and pressure conditions within the battery 100.

Environmental control features may include a waterproof pressure relief valve 112, such as a GORE protective vent, a desiccant contained within the desiccant holder 126, and/or a heat source 144. The heat source 144 may be located in a lower portion of the battery 100 and provide heat to the electrochemical cells 124 to aid in cold temperature operation of the battery 100. The configuration and operation of the heat source is explained in greater detail with reference to FIGS. 7, 8A, and 8B. The waterproof pressure relief valve 112 may allow the pressure within the battery housing 101 to equalize with the outside air pressure while preventing liquids from entering the battery 100. Although some moisture may enter the battery 100 as air passes through the waterproof valve 112, the moisture may be removed within the battery 100 by a desiccant in the desiccant holder 126.

The desiccant within the battery housing 101 can be configured to absorb any moisture initially inside the housing 101 after manufacture, and may later absorb moisture from the air entering the battery housing 101 through the waterproof pressure valve 126 or a crack or hole in the material of the housing 101. In some embodiments, the upper cell holder framework 130 may also serve as a support for the desiccant holder 126. The desiccant holder 126 may be located near the cells 124 within the battery housing 101 so as to most effectively dry the air around the cells 124. However, the desiccant holder may be effective if located in any location within the battery housing 101.

The desiccant within the desiccant holder 126 may include a variety of desiccating or hygroscopic materials, such as silica gel, calcium sulfate, calcium chloride, activated charcoal, zeolites, Drierite, or any other suitable desiccant.

Figure 3:
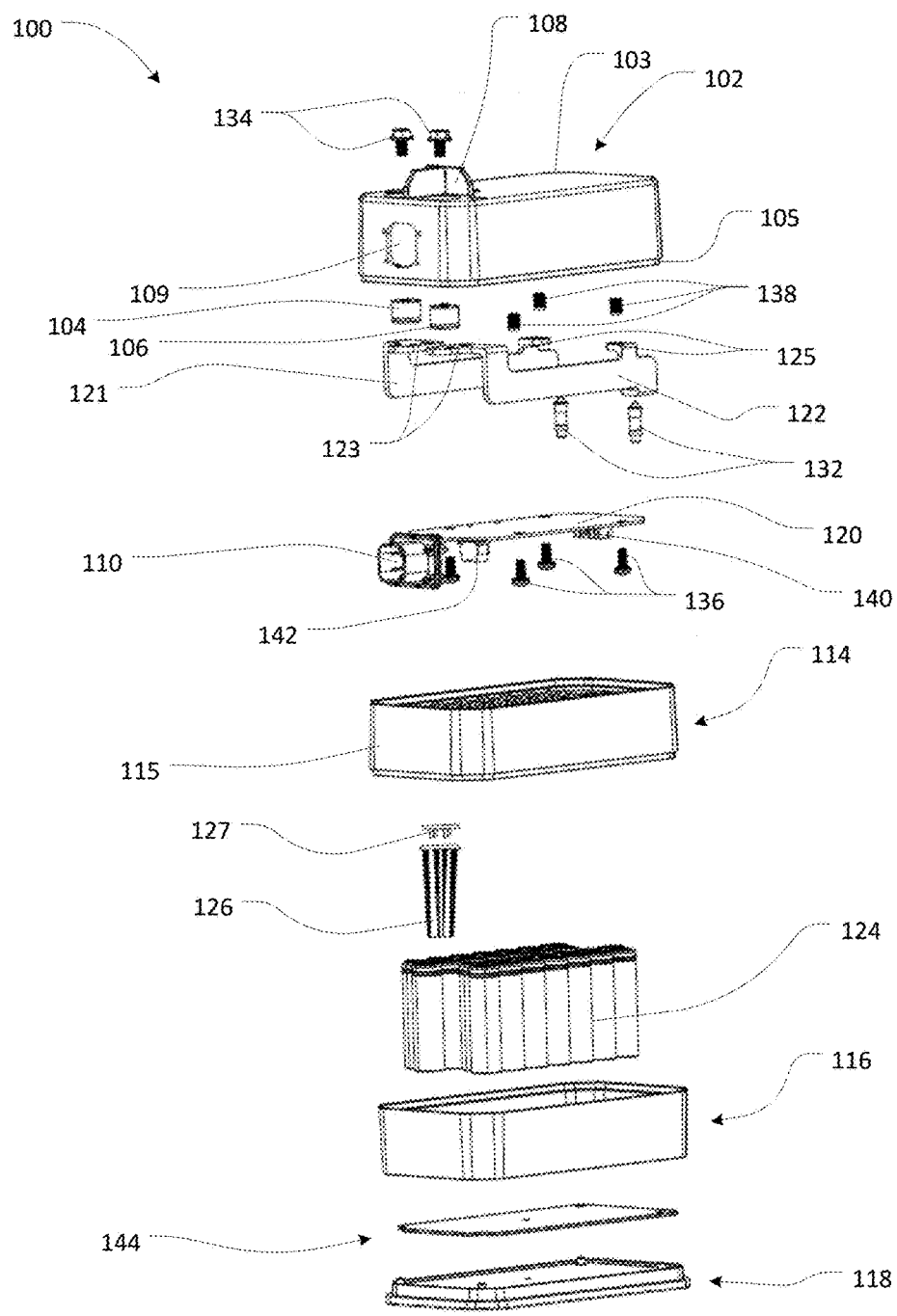
FIG. 3 is an exploded view of an automobile battery of FIG. 1.

FIG. 3 depicts an exploded view of the automotive battery 100 expanded along the transverse axis. As shown, the battery 100 includes a plurality of electrochemical cells 124 contained within a housing comprising a housing lid 102, an upper housing body 114, a lower housing body 116, and a housing baseplate 118, which can be joined, sealed, or welded to form a unitary battery housing. The upper housing body 114 has an upper edge 115. The lid 102 has an upper surface 103 and a lower edge 105. During manufacturing, the upper edge 115 of the upper housing body may be sealingly fitted into, around, or against the lower edge 105 of the lid 102. Such a seal may be formed, for example, using an appropriate sealant, adhesive, weld, vibratory weld, and the like. The lid 102 includes terminal post protection structure 108 on its upper surface 103.

The housing may further contain a desiccant holder 126. A desiccant holder cover 127 may help contain the desiccant within the desiccant holder 126. Such a cap 127 may removably coupled to the desiccant holder 126 via a snap-fit, screw-fit, or other similar configuration. The housing may also contain a heat source 144, which may be coupled to the housing baseplate 118 adjacent to the electrochemical cells 124.

Continuing with FIG. 3, a positive bus bar 121 and a negative bus bar 122 are disposed within the upper housing body 114 and/or the lid 102, and in electrical contact with the electrochemical cells 124 via connecting pins 132 and other circuitry (not shown). Terminal posts 104 and 106 extend through the housing lid 102 to the exterior of the battery 100 and are in electrical communication with the positive bus bar 121 and the negative bus bar 122. The terminal posts 104 and 106 are secured by terminal post fasteners 134. The bus bars 121 and 122 may be held to the lid 102 by flanges 123 and 125 and secured with fasteners 136 and inserts 138. Monitoring and control printed circuit board (PCB) 120 is disposed within an upper portion of the housing and may be configured to monitor the actual voltage across each cell 124 or a set of cells 124, or to monitor the current flowing into or out of the battery 100 through bus bars 121 and 122. The PCB may include elements such as a terminal power header 140 and a thermistor connector 142. The PCB 120 is in electrical communication with the CAN connector 110 which extends through the housing lid 102 at opening 109 to the exterior of the battery 100. The PCB 120 may be supported in place by the CAN connector 110 as well as by the lid 102 and/or bus bars 121 and 122, and may be secured to the lid 102 and/or bus bars 121 and 122 by fasteners 136.

The electrochemical cells 124 are configured to provide direct current power. In some embodiments, the cells 124 may provide sufficient voltage to power a nominal 12-volt automotive power system. The cells 124 may be any variety of electrochemical cell, such as lithium ion, nickel metal hydride, lead acid, or the like. In some embodiments with multiple electrochemical cells 124, the cells 124 may be arranged in any combination of parallel and series connections. For example, a battery delivering a maximum of 15.6 volts may include a single string of four 3.9-volt cells connected in series, multiple 4-cell serial strings connected in parallel, or four serially connected strings of multiple parallel cells, so as to provide a greater energy storage capacity at the same voltage of 15.6 volts.

The housing components 102, 114, 116, and 118 may be assembled at various times during manufacturing to form one housing structure. In some embodiments, housing components 102, 114, 116, and 118 may be glued or otherwise adhered together to form a single housing unit. In embodiments where the housing components are made of a plastic, the housing components may be joined by any suitable variety of plastic welding, such as hot gas welding, hot plate welding, contact welding, speed tip welding, laser welding, solvent welding, or the like, to form a robust protective housing. In some embodiments, the housing may be an integrated unit containing internal structure such as compartments for the electrochemical cells 124, so as to avoid the additional weight and complexity associated with having separate internal structural components.

Figure 4:
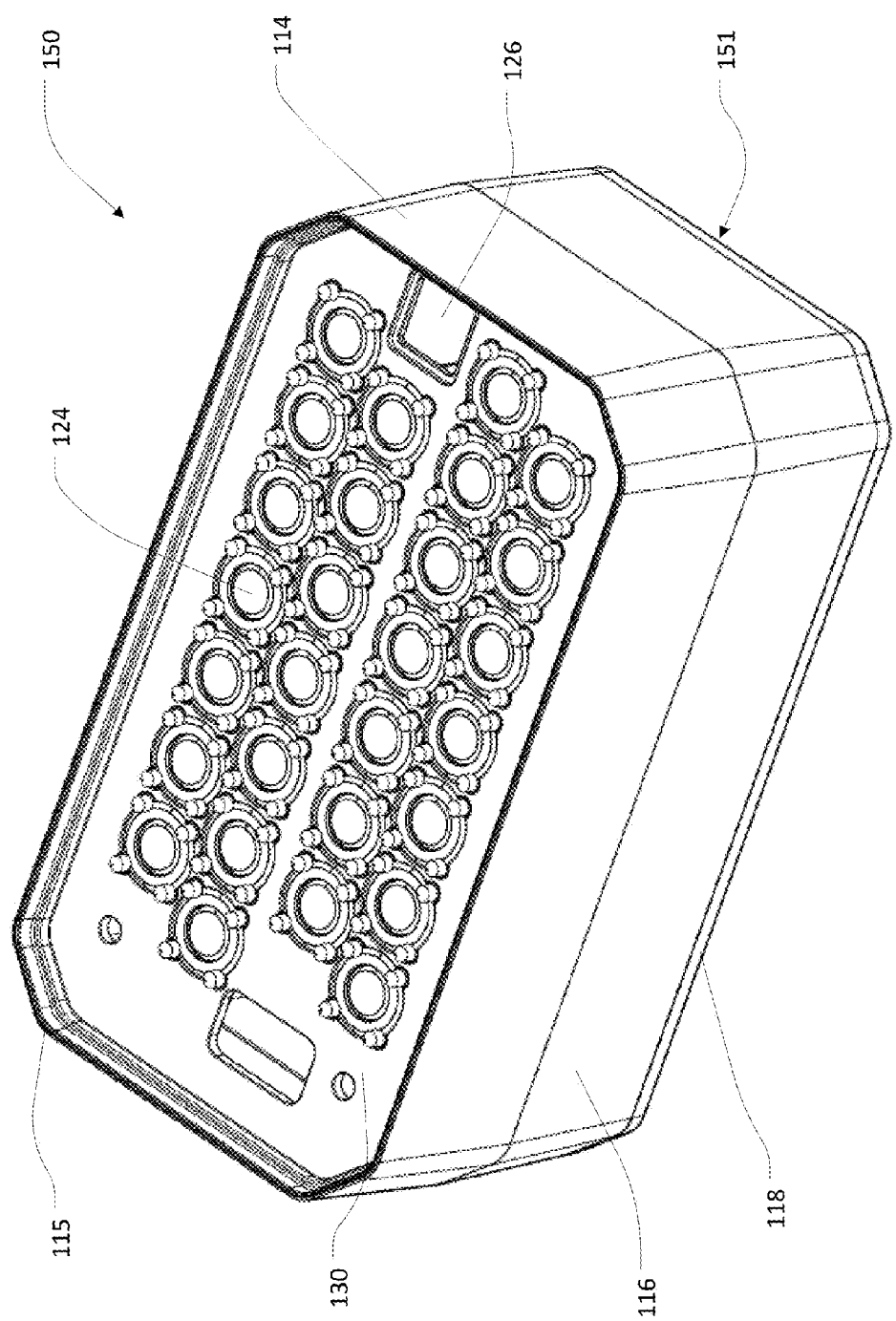
FIG. 4 is a perspective view of the lower portion of the battery of FIG. 1 as prepared for final assembly in accordance with an exemplary embodiment.
Figure 5:
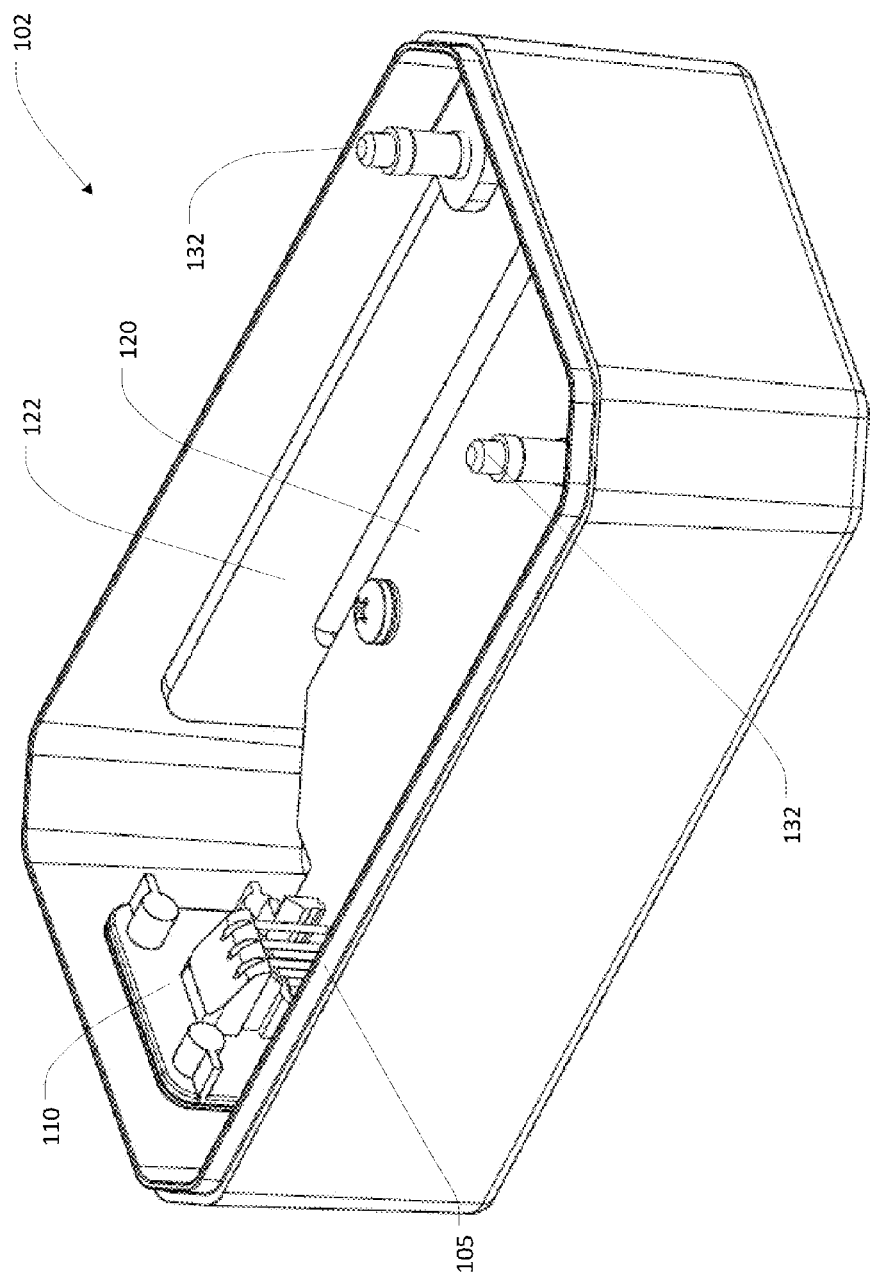
FIG. 5 is a perspective view of the upper portion of the battery of FIG. 1 prepared for final assembly in accordance with an exemplary embodiment. When assembled, the top portion may be inverted from its position shown in FIG. 5 and placed on top of the lower portion shown in FIG. 4 to form an assembled housing as shown in FIG. 3.

With reference to FIGS. 4 and 5, a simplified battery assembly process will now be described. In some aspects, the simplicity and efficiency of the battery assembly process are a result of various battery features described elsewhere herein. FIG. 4 depicts a lower portion 150 of a battery before final assembly. FIG. 5 depicts a lid 102 of a battery before final assembly, in an inverted orientation. A lower portion housing 151 may include the housing components 114, 116, and 118 described above, and may be manufactured with an upper interior framework 130 and lower interior framework 128 (not shown) for holding a plurality of electrochemical cells 124 and a desiccant holder 126, as described above with reference to FIGS. 2 and 3.

The lid 102 may be prepared for assembly by securing a negative bus bar 122 and a positive bus bar 121 (not shown) within the lid 102 with positive and negative terminal posts 104 (not shown) and 106 (not shown) connected to the bus bars 121 (not shown) and 122, and extending through the housing lid 102. Each bus bar has a connecting pin 132 configured to connect with circuitry of the lower portion 150 of the battery during assembly. A PCB 120 for battery monitoring and control may then be secured to the housing lid 102 and/or bus bars 121 (not shown) and 122 with a CAN connector 110 connecting to the PCB 120 through the housing lid 102.

With a completed battery lid 102 and lower battery portion 150, final assembly of the battery is straightforward and suitable for completion on an assembly line or similar high-capacity production line. The plurality of electrochemical cells 124 are inserted into the cylindrical openings in the interior framework 130 of the lower portion housing 151, and a desiccant holder 124 containing desiccant is inserted into the appropriate opening. Circuitry (not shown) configured to connect the cells 124 to the bus bars 121 and 122 may be placed on top of the cells 124. In a final assembly step, the lid 102 is turned upright, placed atop the lower portion 150 and pressed downward to couple the lower edge 105 of the housing lid to the upper edge 115 of the lower portion housing 151. At the same time, bus bar connecting pins 132 will form a press-fit connection to circuitry (not shown) of the lower portion 150, completing the electrical connection between the terminal posts and the electrochemical cells 124 via the bus bars 121 and 122, connecting pins 132, and other circuitry. The housing lid 102 and lower portion housing 151 are sealed at their intersection by any suitable form of plastic welding to complete the assembly.

Figure 6:
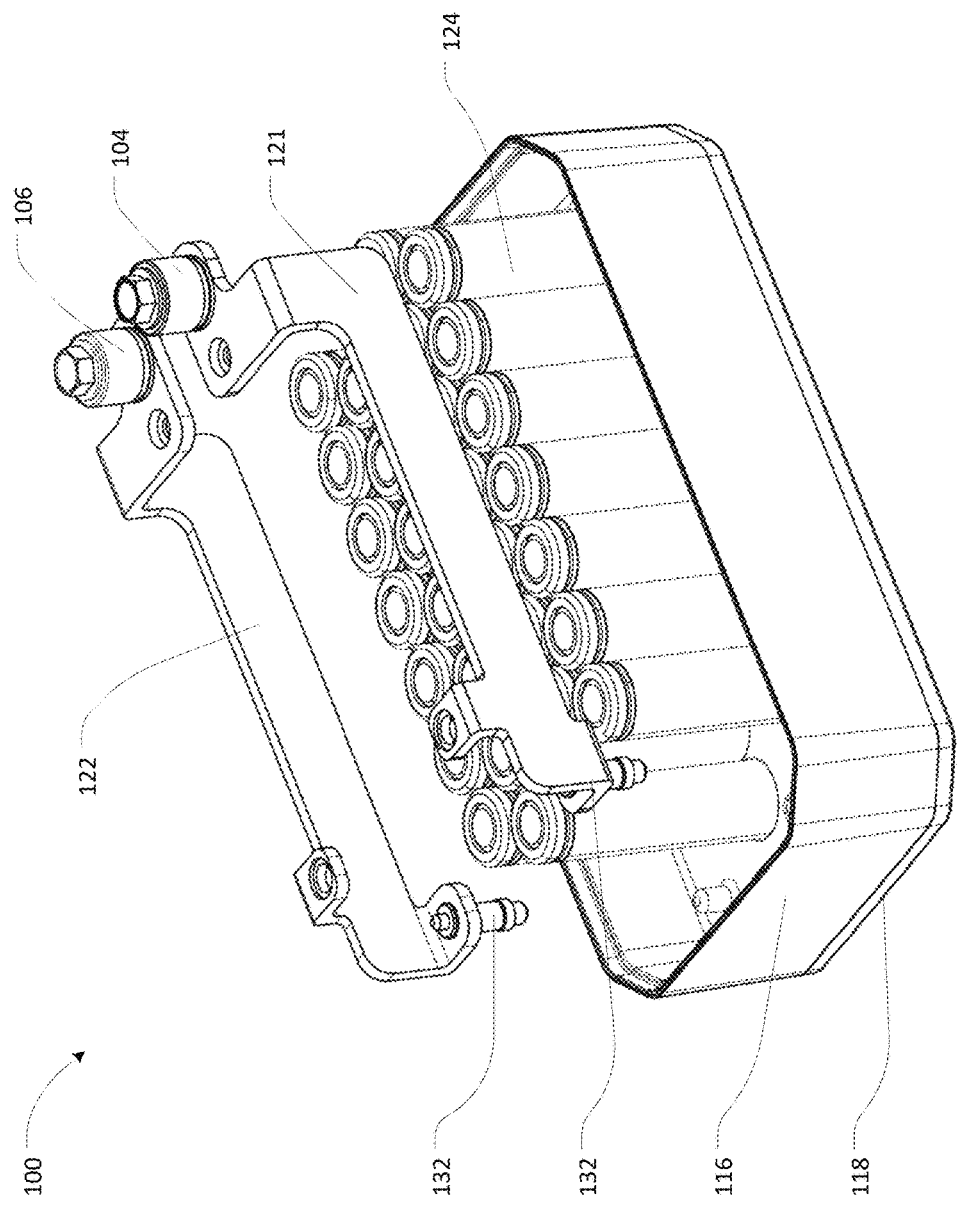
FIG. 6 is a partial cutaway perspective view of the battery of FIG. 1 illustrating the primary electrical connections of the battery in accordance with an exemplary embodiment.

FIG. 6 depicts a cutaway view of a battery 100 showing only the primary electrical connections of the battery 100 after final assembly. As used herein, the term "primary electrical connections" of the battery 100 refers to the conductive path between the electrochemical cells 124 and the terminal posts 104 and 106, by which the electrochemical cells 124 provide nominal 12 volt electrical power to various vehicle systems. Thus, the primary electrical connections do not include other conductive connections to the battery circuit such as control or monitoring systems. The primary electrical connections include the electrochemical cells 124, connecting pins 132, bus bars 121 and 122, terminal posts 104 and 106, and other circuitry (not shown) connecting the cells 124 to the connecting pins 132. For clarity, the baseplate 118 and lower housing body 116 are also depicted. Thus, current can flow between the negative terminal post 106 and the negative terminal of the cells 124 by traveling through the negative bus bar 122, connecting pin 132, and other circuitry (not shown). Similarly, current can flow between the positive terminal of the cells 124 and the positive terminal post 104 by traveling through the other circuitry (not shown), connecting pin 132, and positive bus bar 121.

Figure 7:
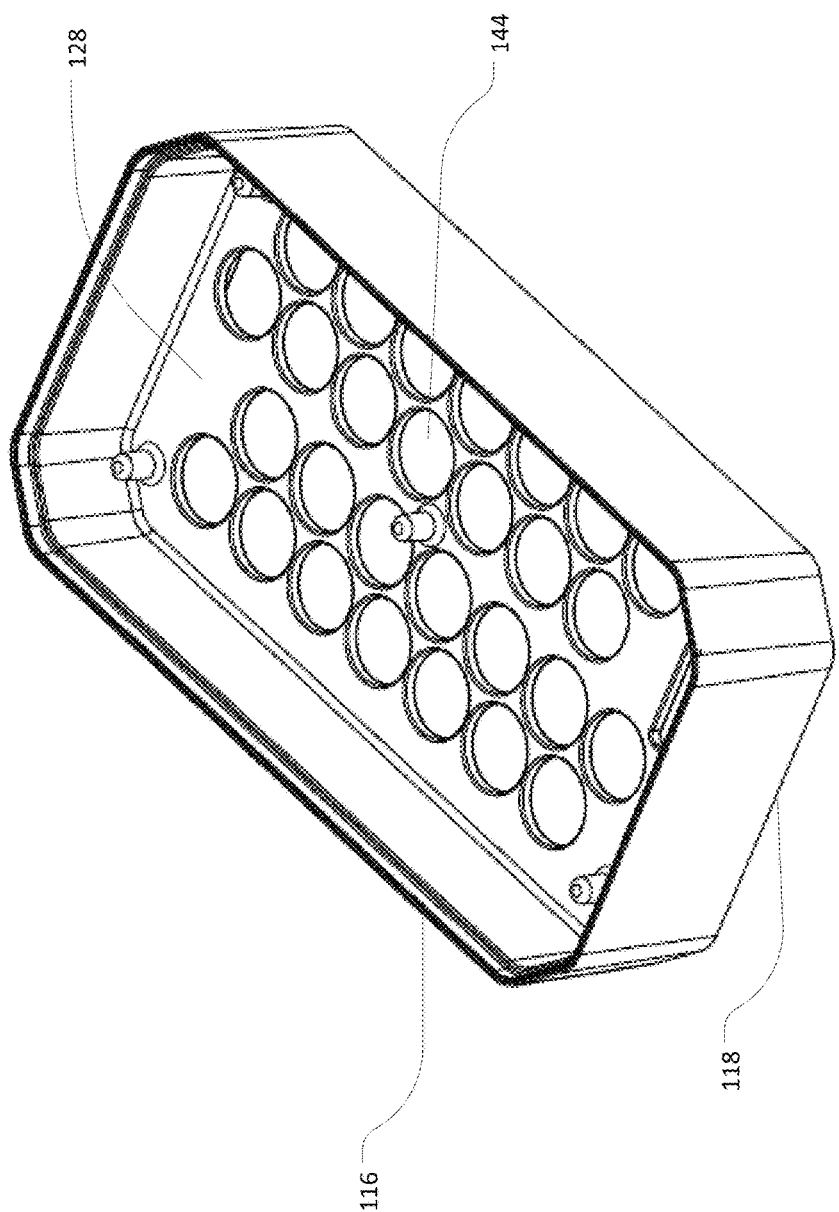
FIG. 7 is a perspective view of a lower housing body and baseplate of the battery of FIG. 1 including a heat source in accordance with an exemplary embodiment.

FIG. 7 is a perspective view of a lower housing body 116 and baseplate 118 of the battery of FIG. 1 including a heat source 144 in accordance with an exemplary embodiment. As described above, the lower housing body 116 may include an integrated lower cell holder framework 128 configured to secure the lower end of a plurality of electrochemical cells (not shown). In some embodiments, the heat source 144 may be a substantially flat heating pad which may be secured between the baseplate 118 and the cell holder framework 128 of the lower housing body 116. The heating pad may be a resistive heating pad. Thus, the heat source 144 may be secured in a desired location adjacent to the end surface of the electrochemical cells (not shown) without requiring additional fasteners, adhesives, or other securing means to avoid unintended movement of the heat source 144.

Figure 8B:
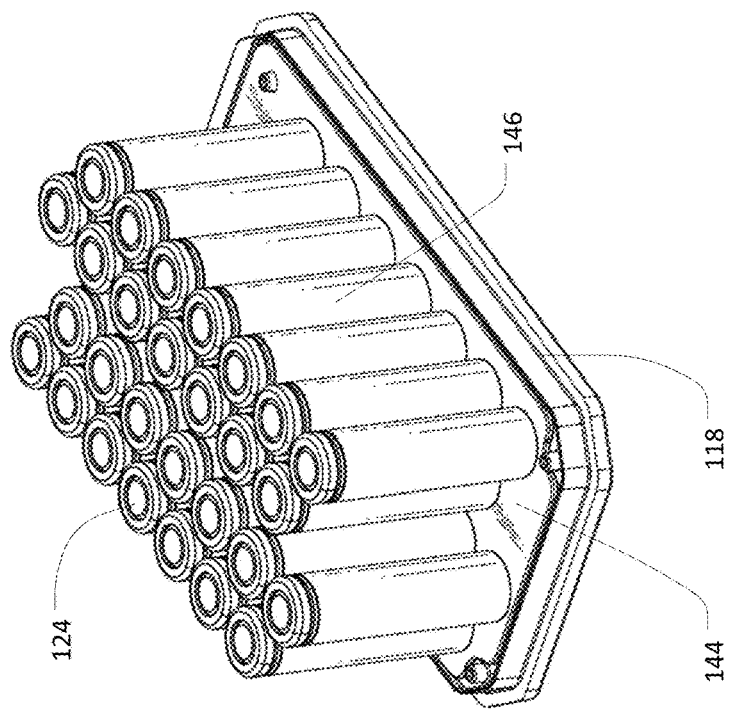
FIG. 8B is a perspective view of the housing baseplate of the battery of FIG. 1 including a configuration of a heat source and a plurality of electrochemical cells in accordance with an exemplary embodiment.
Figure 8A:
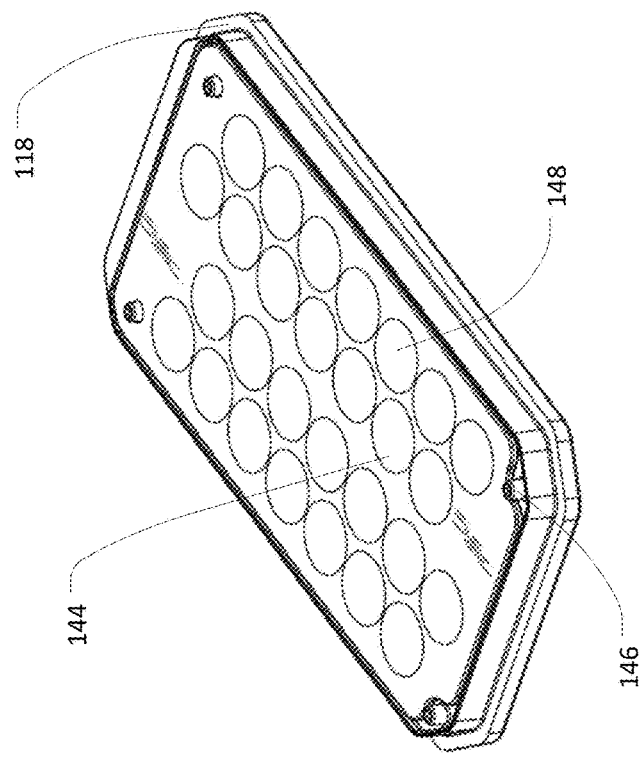
FIG. 8A is a perspective view of the housing baseplate of the battery of FIG. 1 including a heat source in accordance with an exemplary embodiment.

FIG. 8A is a perspective view of a battery housing baseplate 118 with a heat source 144 in accordance with an exemplary embodiment. FIG. 8B depicts an arrangement of the baseplate 118 and heat source 144 of FIG. 8A with the addition of a plurality of electrochemical cells 124 in an exemplary operative configuration. The heat source 144 may provide heat to the electrochemical cells 124.

Cold temperatures may reduce the performance and/or charging ability of various types of battery cells 124. For example, lithium ion cells charge and operate poorly at low temperatures sometimes experienced by automobiles during the winter. More specifically, temperatures below approximately −20° C. may decrease or inhibit discharging. Temperatures below 0° C. may prohibit charging entirely. Thus, a heat source 144 may be necessary for the use of lithium-ion cells in a 12-volt automotive power system.

When battery power or charging is desired, but the cells 124 are colder than a desired minimum operating temperature, such as 0° C. in some embodiments, the heat source 144 may activate to warm the cells 124 to an acceptable operating temperature. A low temperature condition may be detected with a temperature sensor (not shown) and battery monitoring circuitry (not shown). Battery monitoring circuitry (not shown) may be located near or within the heat source 144, or may be located elsewhere, such as in the battery monitoring printed circuit board described above. The temperature sensor (not shown) may be located within or adjacent to at least one of the electrochemical cells 124 in order to accurately measure the temperature of the cells. One or more temperature sensors may be used. For example, the temperature sensors may include one or more thermistors, thermocouples, or other temperature sensing devices. In various embodiments, temperature sensors may be placed directly adjacent to an exterior surface of one or more cells 124, and may be secured against the surface with an adhesive tape or other suitable securing means.

After a period of heating, the temperature sensor (not shown) and battery monitoring circuitry (not shown) may detect that the cells have reached an acceptable operating temperature. In some implementations, the battery monitoring circuitry may comprise the PCB 120 (shown, for example in FIG. 3). In response, the battery monitoring circuitry (not shown) may deactivate the heat source 144, and the cells 124 may begin or continue to charge and/or provide power. Continued operation of the cells 124 may generate enough heat to maintain an acceptable operating temperature without further use of the heat source 144. If continued operation does not generate enough heat due to very low ambient temperature or insufficient current draw, the heat source 144 may be reactivated to maintain an acceptable operating temperature.

In some embodiments, the heat source 144 may operate with a predetermined maximum heating time to avoid runaway or excessive heating conditions. For example, a failure of the temperature sensor (not shown) may cause a false low temperature indication even after the cells 124 have reached an acceptable operating temperature. A false low temperature indication may result in the circuitry (not shown) causing the heat source 144 to continue heating the cells 124 until damage or failure occurs. However, a predetermined maximum heating time will ensure that the heat source 144 stops heating the cells 124 before damage can occur.

The heat source 144 may be disposed adjacent to the battery housing baseplate 118. In some embodiments, the baseplate 118 may comprise transverse extensions 146 configured to extend through the heat source 144 to prevent longitudinal or lateral motion of the heat source 144. Preferably, the heat source 144 will be in thermal contact with a surface of the cells 124. In some embodiments, the heat source 144 may be in thermal contact with the lower end surfaces of the cells 124, or may be in thermal contact with the side surfaces of the cells 124. The arrangement of a heat source 144 in thermal contact with the cells 124 increases the efficiency of heating the cells 124 by allowing the cells 124 to be rapidly warmed to an acceptable operating temperature without having to warm the entire space within the battery housing 101.

The heat source 144 may provide heat to the electrochemical cells 124 by direct contact, thermal radiation, or similar heat transfer processes. The heat source 144 may be a single heating element 144 contacting the bottom of all cells 124, or may include multiple smaller heating elements 148. For example, in some embodiments including a plurality of cylindrical electrochemical cells 124, the heat source may include a plurality of circular heating elements 148, each sized and shaped to heat the circular end surface of a single cell 124. The plurality of circular heating elements 148 may be arranged in an array within a generally flat heating pad 144 such that each heating element 148 is located where it will contact the lower surface of a cell 124, either directly or with one or more layers of heat conducting material between the cell 124 and the heating element 148. It is noted that where a heat source 144 is placed against one circular end surface of a cylindrical cell 124, it may be necessary for both the positive and negative terminals of the cell 124 to be located together on the opposite circular end surface of the cell 124.

The heat source 144 may require electrical power to provide heat to the cells 124. Electrical power for the heat source 144 may be provided by the cells 124. For example, when the temperature is too cold for charging or optimal discharging, the cells 124 may still be able to provide enough current to activate the heat source 144 long enough to warm the cells 124 to a preferred temperature. In electric vehicles, the heat source 144 may be configured to draw electrical power from high voltage batteries of the electric vehicle. For example, the cells 124 at a low temperature may still be able to provide enough current to activate the high voltage powertrain batteries. The activated high voltage batteries can then provide power to the heat source 144, either directly or through a DC-to-DC converter.

The foregoing description details certain embodiments of the systems, devices, and methods disclosed herein. It will be appreciated, however, that no matter how detailed the foregoing appears in text, the devices and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated. The scope of the disclosure should therefore be construed in accordance with the appended claims and any equivalents thereof.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

It is noted that the examples may be described as a process. Although the operations may be described as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc.

The previous description of the disclosed implementations is provided to enable any person skilled in the art to make or use the present disclosed process and system. Various modifications to these implementations will be readily apparent to those skilled in the art, and the generic principles defined herein may be applied to other implementations without departing from the spirit or scope of the disclosed process and system. Thus, the present disclosed process and system is not intended to be limited to the implementations shown herein but is to be accorded the widest scope consistent with the principles and novel features disclosed herein.

What is claimed is:

1. A low voltage battery for an electric vehicle, the battery comprising:
   a plurality of electrochemical cells;
   a heat source configured to increase a temperature of at least one of the plurality of electrochemical cells when the heat source is activated, wherein the heat source receives power from one or more of the plurality of electrochemical cells;
   a control circuit configured to control activation of the heat source; and
   a battery housing configured to enclose the plurality of electrochemical cells, the heat source, and the control circuit, wherein the control circuit is configured to control activation of the heat source based on one or more conditions of the battery housing.

2. The battery of claim 1, further comprising:
   a temperature sensor disposed within the housing and configured to measure the temperature of at least one of the plurality of electrochemical cells, wherein the control circuit is in communication with the temperature sensor and the heat source and wherein the control circuit is further configured to receive temperature information from the temperature sensor and control the heat source based at least in part on the received temperature information.

3. The battery of claim 2, wherein the plurality of electrochemical cells have a minimum operating temperature.

4. The battery of claim 3, wherein the control circuit is further configured to activate the heat source when the temperature sensor measures a temperature lower than the minimum operating temperature.

5. The battery of claim 4, wherein the control circuit is further configured to deactivate the heat source when the temperature sensor measures a preselected deactivation temperature that is greater than or equal to the minimum operating temperature.

6. The battery of claim 5, wherein the control circuit is further configured to deactivate the heat source after a preselected maximum heating time.

7. The battery of claim 1, wherein the heat source comprises a resistive heating pad.

8. An electric vehicle with a battery heating system, the vehicle comprising:
   a first battery comprising a housing, a plurality of electrochemical cells within the housing, and a heat source,
   wherein each of the plurality of electrochemical cells and the heat source are disposed entirely within the housing and wherein the housing comprises a lid and a plurality of terminal posts each extending through the lid and coupling to one or more of the plurality of electrochemical cells; and
   a second battery;
   wherein the first battery is configured to provide power to the second battery, and wherein the second battery is configured to provide power to the heat source.

9. The electric vehicle of claim 8, wherein the first battery further comprises:
   a temperature sensor configured to measure a temperature of at least one of the plurality of electrochemical cells; and
   circuitry in communication with the temperature sensor and the heat source, the circuitry configured to receive temperature information from the temperature sensor and control the heat source based at least in part on the received temperature information.

10. The electric vehicle of claim 9, wherein the plurality of electrochemical cells have a minimum operating temperature.

11. The electric vehicle of claim 10, wherein the circuitry is configured to activate the heat source when the temperature sensor measures a temperature lower than the minimum operating temperature.

12. The electric vehicle of claim 11, wherein the circuitry is further configured to deactivate the heat source when the temperature sensor measures a preselected deactivation temperature greater than or equal to the minimum operating temperature.

13. The electric vehicle of claim 12, wherein the circuitry is further configured to deactivate the heat source after a preselected maximum heating time.

14. The electric vehicle of claim 11, wherein activating the heat source comprises transmitting power from the first battery to engage the second battery and transmitting power from the second battery to engage the heat source.

15. The electric vehicle of claim 8, wherein the heat source comprises a resistive heating pad.

16. A method of starting an electric vehicle, the method comprising:
   transmitting power from a first battery of an electric vehicle to a second battery of the electric vehicle;
   transmitting power from the second battery to a heat source disposed entirely within a housing of the first battery, wherein the housing also houses a plurality of electrochemical cells of the first battery, and wherein the housing comprises a lid and a plurality of terminal posts each extending through the lid and coupling to one or more of the plurality of electrochemical cells; and
   warming the first battery with the heat source.

17. The method of claim 16, wherein the first battery comprises at least one temperature sensor.

18. The method of claim 17, further comprising detecting a temperature with the temperature sensor.

19. The method of claim 18, further comprising deactivating the heat source when the temperature sensor detects a temperature greater than or equal to a desired operating temperature.

20. The method of claim 18, further comprising deactivating the heat source after a preselected maximum heating time.

* * * * *